United States Patent
Parikh et al.

(10) Patent No.: US 12,023,619 B2
(45) Date of Patent: Jul. 2, 2024

(54) SPLIT FLOW AXIAL CRANKCASE SEPARATOR

(71) Applicant: Cummins Filtration IP, Inc., Columbus, IN (US)

(72) Inventors: Chirag D. Parikh, Madison, WI (US); Peter K. Herman, Stoughton, WI (US); Arun P. Janakiraman, Stoughton, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 436 days.

(21) Appl. No.: 17/426,037

(22) PCT Filed: Jan. 28, 2020

(86) PCT No.: PCT/US2020/015362
§ 371 (c)(1),
(2) Date: Jul. 27, 2021

(87) PCT Pub. No.: WO2020/163114
PCT Pub. Date: Aug. 13, 2020

(65) Prior Publication Data
US 2022/0088523 A1  Mar. 24, 2022

Related U.S. Application Data

(60) Provisional application No. 62/800,677, filed on Feb. 4, 2019.

(51) Int. Cl.
*B01D 46/00* (2022.01)
*B01D 46/12* (2022.01)
(Continued)

(52) U.S. Cl.
CPC ..... *B01D 46/0056* (2013.01); *B01D 46/0031* (2013.01); *B01D 46/12* (2013.01);
(Continued)

(58) Field of Classification Search
CPC .............. B01D 46/003; B01D 46/0031; B01D 46/0056; B01D 46/60; B01D 46/527;
(Continued)

(56) References Cited

U.S. PATENT DOCUMENTS 3,763,631 A  10/1973  Horn et al.
4,673,423 A  6/1987  Yumlu
(Continued)

FOREIGN PATENT DOCUMENTS

GB      2070971 A  *  9/1981  ......... B01D 46/0021
IN   2286/KOLNP/2013     4/2014
WO   WO-2018/236921     12/2018

OTHER PUBLICATIONS

International Search Report and Written Opinion issued for PCT Application No. PCT/US2020/015362 dated Apr. 14, 2020, 9 pages.
(Continued)

*Primary Examiner* — Robert Clemente
(74) *Attorney, Agent, or Firm* — Foley & Lardner LLP

(57) ABSTRACT

A rotating separator includes a filter housing extending axially along a longitudinal axis and a filter element positioned within the filter housing. The filter element includes a first endplate and a second endplate operatively coupled to the first endplate, a first element core and a second element core positioned between the first endplate and the second endplate and configured to filter a contaminate from a fluid. An interior cavity is defined between the first endplate, the second endplate, the first element core, and the second element core. Fluid flowing through the filter element enters the interior cavity and is split between and flows in parallel through the first element core and the second element core.

24 Claims, 18 Drawing Sheets

(51) Int. Cl.
*B01D 46/52* (2006.01)
*F01M 13/04* (2006.01)

(52) U.S. Cl.
CPC ........... *B01D 46/527* (2013.01); *F01M 13/04* (2013.01); *B01D 2271/027* (2013.01); *F01M 2013/0438* (2013.01)

(58) Field of Classification Search
CPC .. B01D 46/12; B01D 2271/027; F01M 13/04; F01M 2013/0438
See application file for complete search history.

(56) References Cited

U.S. PATENT DOCUMENTS

| | | | |
|---|---|---|---|
| 5,250,094 A | 10/1993 | Chung et al. |
| 5,564,401 A | 10/1996 | Dickson |
| 6,152,120 A | 11/2000 | Julazadeh |
| 6,183,407 B1 | 2/2001 | Hallgren et al. |
| 6,251,168 B1 | 6/2001 | Birmingham et al. |
| 6,517,612 B1 | 2/2003 | Crouch et al. |
| 6,640,792 B2 | 11/2003 | Harvey et al. |
| 6,925,993 B1 | 8/2005 | Eliasson et al. |
| 7,235,177 B2 | 6/2007 | Herman et al. |
| 2002/0144937 A1 | 10/2002 | Wilberscheid et al. |
| 2005/0120685 A1 | 6/2005 | Fischer et al. |
| 2005/0252845 A1 | 11/2005 | Kemmelmeyer |
| 2007/0249479 A1 | 10/2007 | Eliasson et al. |
| 2008/0264251 A1 | 10/2008 | Szepessy |
| 2010/0180854 A1 | 7/2010 | Baumann et al. |
| 2013/0056407 A1 | 3/2013 | Parikh et al. |
| 2014/0033668 A1 | 2/2014 | Kleynen |
| 2017/0001133 A1 | 1/2017 | Ishida et al. |
| 2017/0120180 A1 | 5/2017 | Wood et al. |
| 2017/0296956 A1 | 10/2017 | Ishida et al. |
| 2018/0117512 A1 | 5/2018 | Janakiraman et al. |
| 2018/0140986 A1 | 5/2018 | Parikh et al. |
| 2018/0169556 A1 | 6/2018 | Parikh et al. |
| 2018/0236387 A1 | 8/2018 | Parikh et al. |
| 2018/0243677 A1 | 8/2018 | Schwandt et al. |
| 2019/0299134 A1 | 10/2019 | Herman et al. |

OTHER PUBLICATIONS

International Search Report and Written Opinion issued for PCT Application No. PCT/US2020/063533 dated Mar. 17, 2021, 20 pages.
Office Action issued for U.S. Appl. No. 17/795,057 dated Jul. 6, 2023 35 pages.
First Examination Report on IN Patent Application No. 202247036000 dated Sep. 23, 2022 (6 pages).

* cited by examiner

SPLIT FLOW AXIAL CRANKCASE SEPARATOR

CROSS REFERENCE TO RELATED APPLICATIONS

This application is a National Stage of PCT Application No. PCT/US2020/015362 filed Jan. 28, 2020, which claims the benefit of U.S. Provisional Patent Application No. 62/800,677 filed Feb. 4, 2019. The contents of these applications are incorporated herein by reference in their entirety and for all purposes.

TECHNICAL FIELD

The present invention relates generally to filter assemblies for filtering fluids in internal combustion engine systems.

BACKGROUND

During operation of an internal combustion engine, a fraction of combustion gases, called blowby gases, can flow out of the combustion cylinder and into the crankcase of the engine. The blowby gases can include a mixture of aerosols, oils, and air. The blowby gases are typically routed out of the crankcase via a crankcase ventilation system. The crankcase ventilation system may pass the blowby gases through a rotating separator to remove a majority of the aerosols and oils contained in the blowby gases. The filtered blowby gases are then either vented to the ambient (in open crankcase ventilation systems) or routed back to the air intake for the internal combustion engine for further combustion (in closed crankcase ventilation systems). In rotating separators, the contaminants (e.g., oil droplets suspended and transported by blowby gases) are separated at least in part by centrifugal separation techniques. In various conventional rotating separators, a single filter core element design may be used, which can result in relatively high pressure drops across the filter element. As an example, the pressure drop caused by fluid flow through the filter element increases proportionally with the length of the channels within an element core.

SUMMARY

Various example embodiments relate to a filter element. The filter element includes a first endplate and a second endplate operatively coupled to the first endplate, a first element core and a second element core positioned between the first endplate and the second endplate and configured to filter a contaminate from a fluid. An interior cavity is defined between the first endplate, the second endplate, the first element core, and the second element core. Fluid flowing through the filter element enters the interior cavity and is split between and flows in parallel through the first element core and the second element core.

Other example embodiments relate to a rotating separator. The rotating separator includes a filter housing extending axially along a longitudinal axis and a filter element positioned within the filter housing. The filter element includes a first endplate and a second endplate operatively coupled to the first endplate, a first element core and a second element core positioned between the first endplate and the second endplate and configured to filter a contaminate from a fluid. An interior cavity is defined between the first endplate, the second endplate, the first element core, and the second element core. Fluid flowing through the filter element enters the interior cavity and is split between and flows in parallel through the first element core and the second element core.

Still other example embodiments relate to a filter element. The filter element includes a first endplate and a second endplate operatively coupled to the first endplate. The filter element further includes a first element core and a second element core each positioned between the first endplate and the second endplate and configured to filter a contaminate from a fluid. An interior cavity is defined between the first endplate, the second endplate, the first element core, and the second element core. The filter element further includes a shroud extending proximate at least one of the first element core and the second element core and comprising an internal surface where liquid droplets separated from the fluid flowing through the filter element flow downward toward a drain formed between the shroud and the second endplate.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, a rotating separator configured to filter fluid exiting a crankcase is shown. The rotating separator comprises a filter element including first and second endplates operatively coupled together. The filter element includes two or more filter element cores configured to filter fluid flowing through the filter element prior to the fluid exiting an engine system. Accordingly, the filter element cores include a filter structure (e.g., axially wrapped media, axial corrugated channels, etc.) configured to filter the fluid.

Fluid flows in an axial direction and in parallel through the multiple filter element cores. As such, the fluid flowing through the filter element is split between and filtered by the multiple filter element cores. It should be understood that, as used herein, the term "split" does not necessitate an equal (i.e. 50%/50%) division in the flow of the fluid between the filter element cores. Splitting the flow between multiple filter element cores in parallel inside a single filter element may significantly reduce the pressure drop across the filter element (e.g., by 1 divided by the number of cores squared) as compared to a single core element design. In addition, splitting the flow using multiple, shorter cores does not impact the separation efficiency, which is a function of g-force and resident time of the fluid. Splitting the flow allows for more inlet area to be available for the same amount of flow, which enables a reduction in flow velocity through each core and a higher resident time. Therefore, even though the distance a fluid travels through each core is reduced, the flow velocity is also reduced thereby increasing the resident time of the fluid. The reduction in pressure drop enables a smaller overall size of the filter element core. By enabling a smaller overall size of the filter element, the energy required to drive the filter element is reduced (e.g., due to the reduction in surface area drag), thereby reducing the power consumption without compromising separation efficiency. In addition, the reduction in pressure drop enables a reduction in the amount of material required to achieve a higher separation efficiency at a lower pressure drop compared to a single core element design. By reducing the amount of material in the filter element, the weight and cost of the element is reduced without sacrificing the separation efficiency of the element. In addition, the reduction in pressure drop is also advantageous in avoiding bypass flow at a dynamic seal location.

Figure 1:
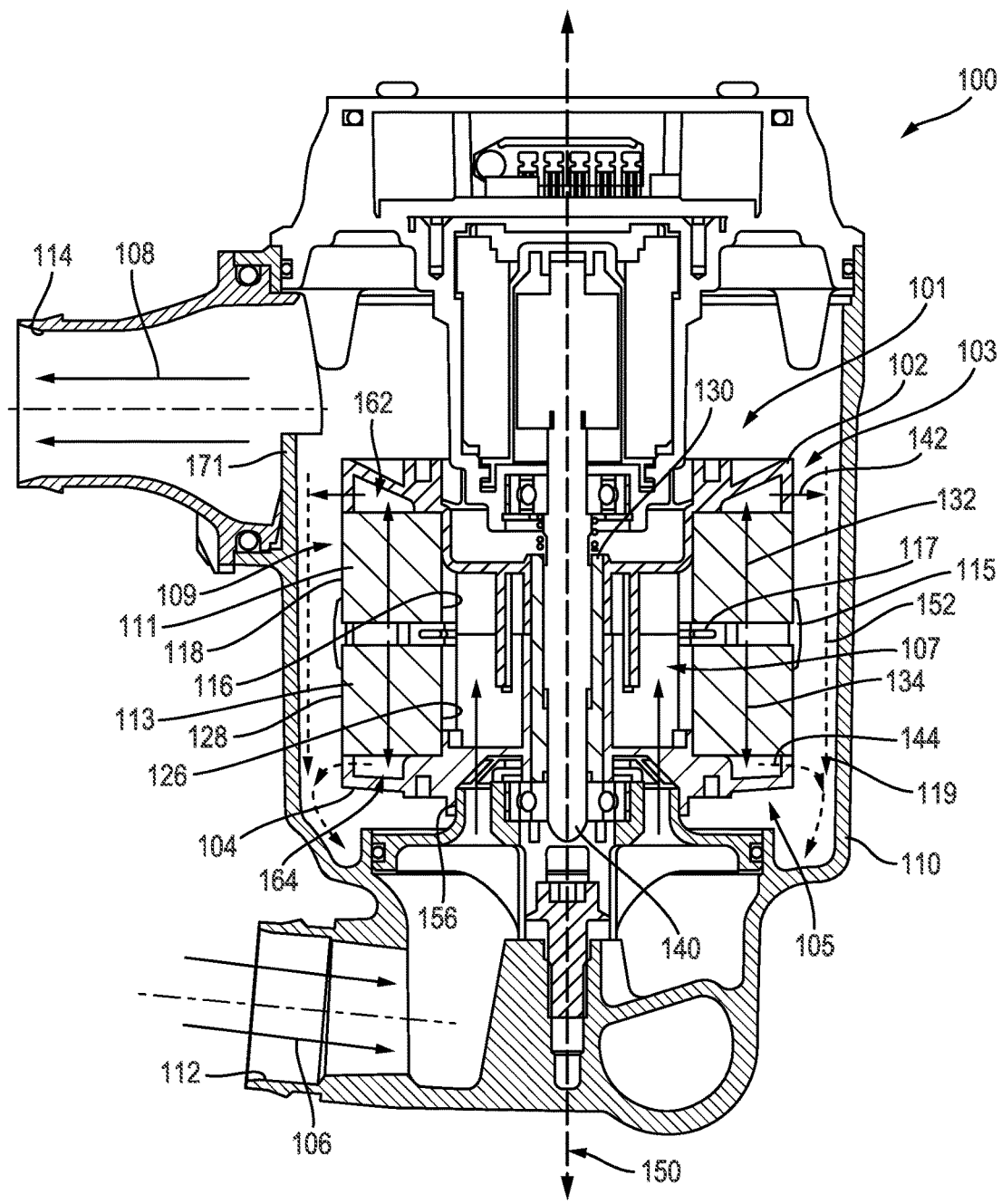
FIG. 1 shows a cross-sectional view of a rotating separator, according to an example embodiment.
Figure 2:
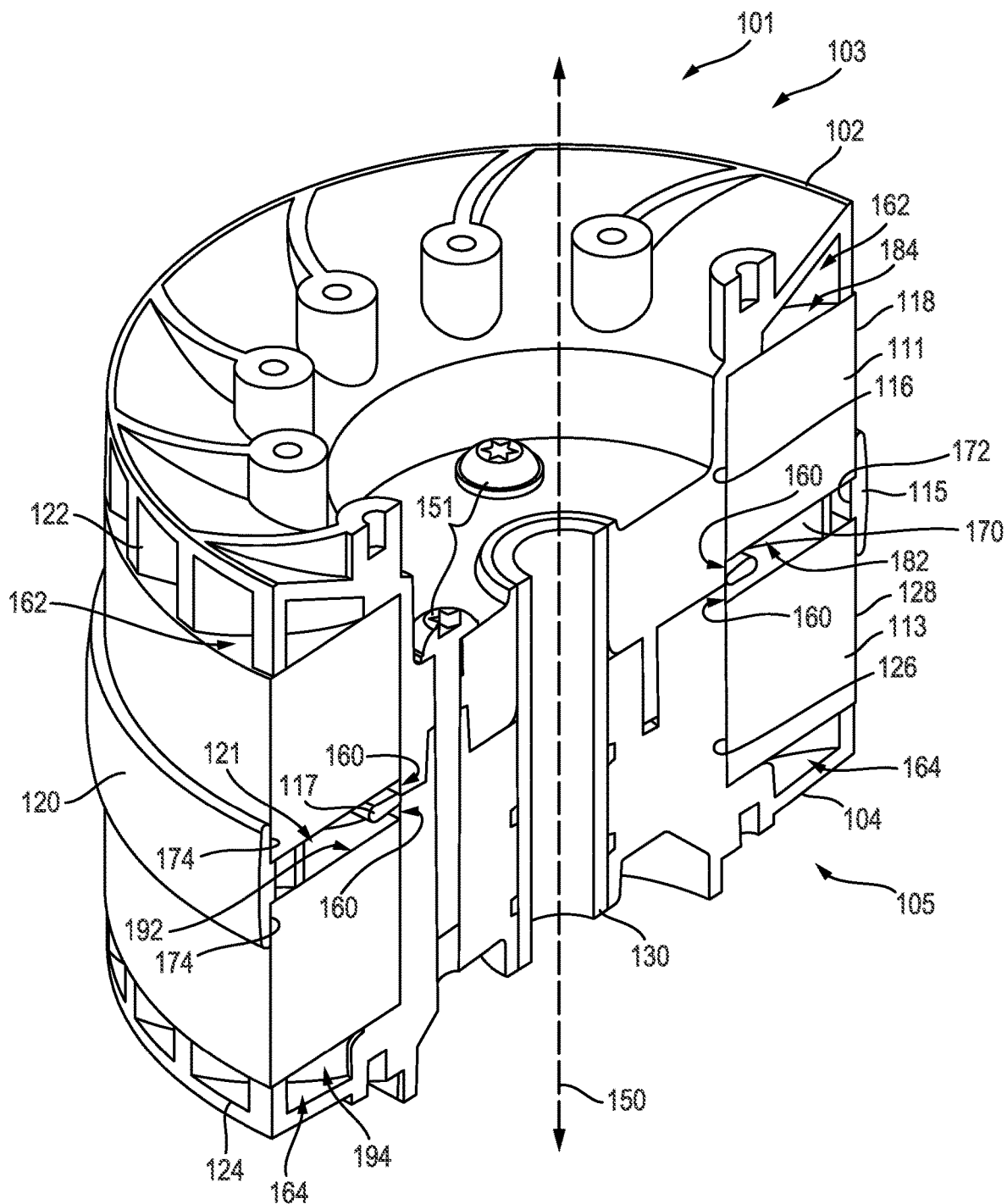
FIG. 2 shows a portion of a perspective cross-sectional view of the rotating separator of FIG. 1.
Figure 3:
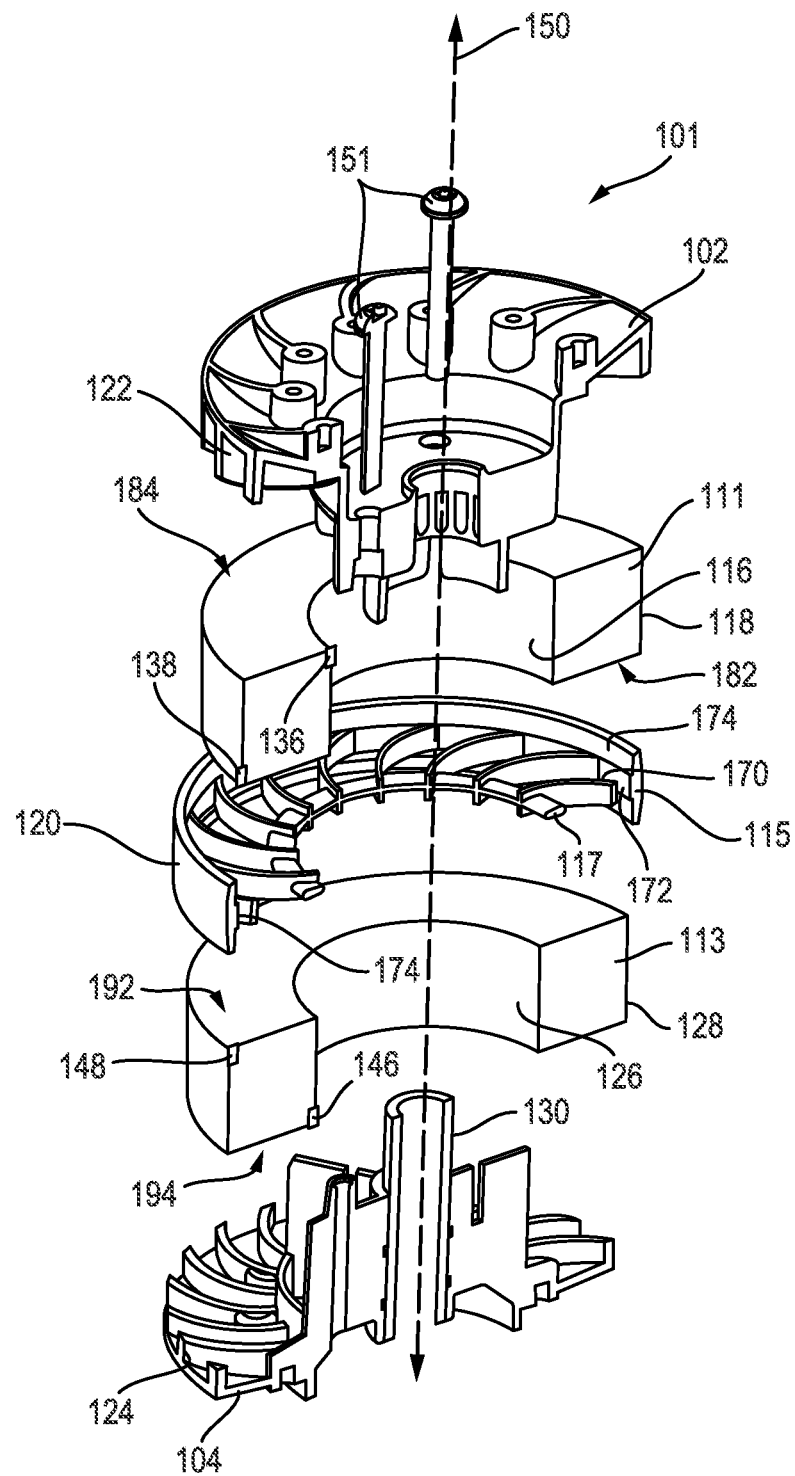
FIG. 3 shows an exploded view of a portion of the rotating separator of FIG. 1.
Figure 10:
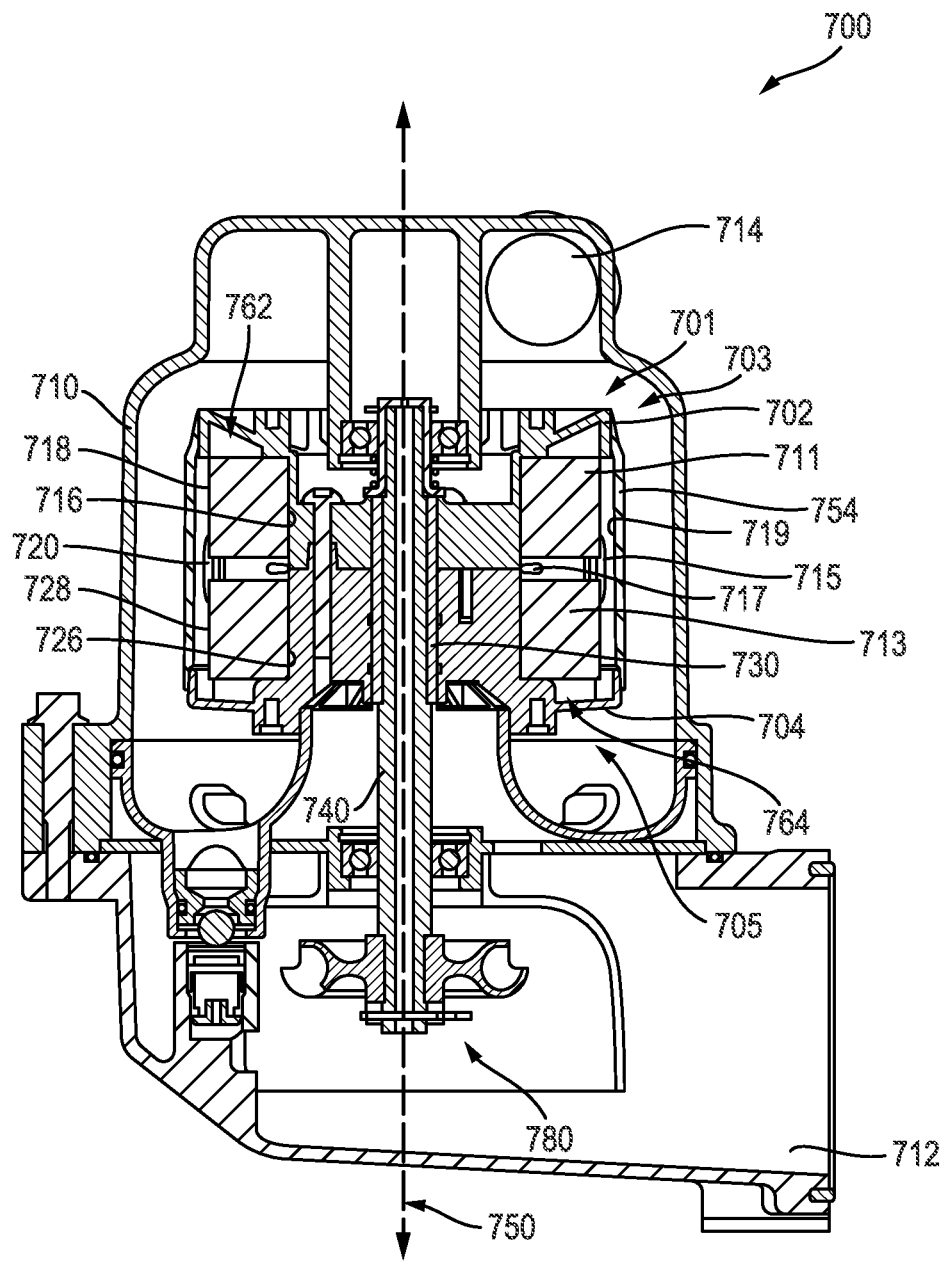
FIG. 10 shows a cross-sectional view of a rotating separator, according to another example embodiment.
Figure 11:
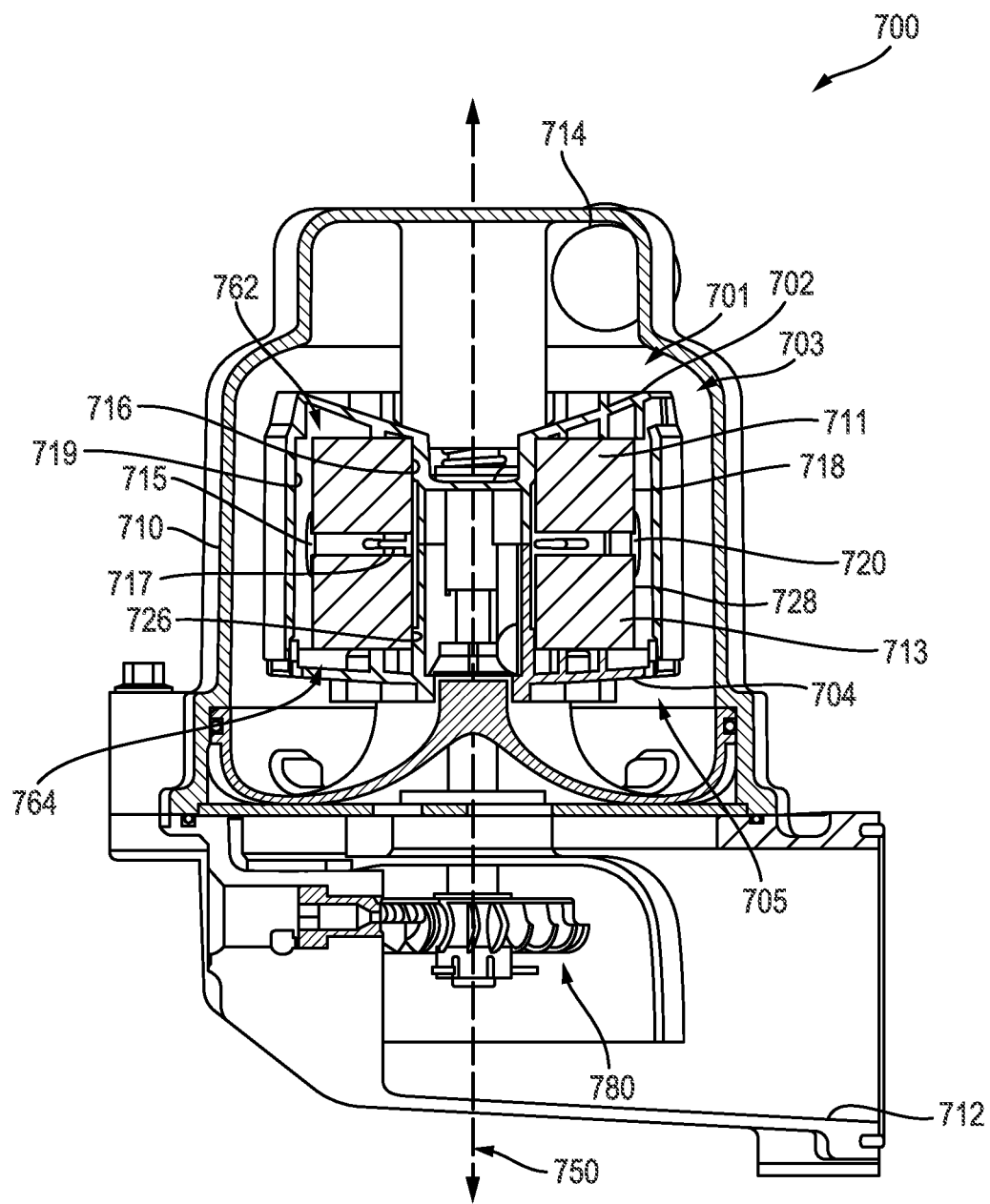
FIG. 11 shows another cross-sectional view of the rotating separator of FIG. 10.

Referring to FIGS. 1-3, a rotating separator 100 is shown according to an example embodiment. The rotating separator 100 includes a filter element 101 having a longitudinal axis 150, where the filter element 101 is positioned within a filter housing 110. The filter element 101 includes a first endplate 102 and a second endplate 104 operatively coupled together (e.g., via fasteners 151 shown in FIG. 2), with an internal cavity 107 defined between the first endplate 102 and the second endplate 104. The rotating separator 100 is a separating element configured to filter a contaminate from fluid flowing therethrough. The rotating separator 100 includes a center tube 130 extending along the longitudinal axis 150. The rotating separator 100 is mechanically coupled to a shaft 140 and driven by an electric motor. In some embodiments, as shown in FIGS. 10-11, the rotating separator (e.g., separator 700) includes a shaft (e.g., shaft 740) driven by a hydraulically-driven turbine (e.g., turbine 780). In other embodiments, the rotating separator 100 is driven by a mechanical coupling (e.g., via center tube 130, via an insert in the center tube 130) to a component of the engine, e.g., axially extending shaft connected to a gear or drive pulley of the engine.

The rotating separator 100 includes a first element core 111 and a second element core 113 disposed between the first endplate 102 and the second endplate 104. The first element core 111 and second element core 113 are arranged along the longitudinal axis 150, with one of the first element core 111 and second element core 113 positioned above the other along the longitudinal axis 150.

Referring to FIG. 2, the first element core 111 and the second element core 113 are fitted between the first endplate 102 and the second endplate 104 and, as such, extend between a first axial end 103 and a second axial end 105 of the filter element 101. The first element core 111 is wound directly on the first endplate 102 and the second element core 113 is wound directly on the second endplate 104. A contact seal 136 (first inner diameter seal 136 shown in FIG. 3) is formed between an inner diameter of the first element core 111 and the first endplate 102, and a contact seal 146 (second inner diameter seal 146 shown in FIG. 3) is also formed between an inner diameter of the second element core 113 and the second endplate 104, as described further herein. In other embodiments, the first element core 111 and second element core 113 are positioned between the first endplate 102 and the second endplate 104 in a radial interference fit. In other embodiments, the first element core 111 is potted or embedded with the first endplate 102 at one axial end and the second element core 113 is potted or embedded with the second endplate 104 at the opposite axial end. In still other embodiments, the first element core 111 and the second element core 113 are positioned and held between the first endplate 102 and the second endplate 104 using other techniques.

The first element core 111 is arranged in a cylindrical manner, with an interior surface 116 defining a portion of the internal cavity 107 and an exterior surface 118 defining a portion of an exterior channel 109 (e.g., defined between the exterior surface 118 of the first element core 111 and an interior surface 119 of the filter housing 110). The second element core 113 is arranged in a cylindrical manner with an interior surface 126 defining a portion of the internal cavity 107 and an exterior surface 128 defining a portion of an exterior channel 109 (e.g., defined between the exterior surface 128 of the second element core 113 and an interior surface 119 of the filter housing 110).

A spacer 120 is positioned axially between the first element core 111 and the second element core 113. Accordingly, the spacer 120 is positioned about the longitudinal axis 150. The spacer 120 includes an outer ring 115 and an inner ring 117. The spacer 120 forms a gap 121 between the first element core 111 and the second element core 113. Vanes 170 extend between the interior surfaces 116, 126 of the first element core 111 and the second element core 113 and the inner diameter 172 of the spacer 120. The vanes 170 are configured to enable reduction in flow circulation in the gap 121 between the first element core 111 and the second element core 113. In some embodiments, the vanes 170 are radial or spiral-shaped vanes.

The outer ring 115 of the spacer 120 includes sealing surfaces 174 positioned on each side of the gap 121. The sealing surfaces 174 create a first outer diameter seal 138 (e.g., dynamic seal) against the exterior surface 118 of the first element core 111 and a second outer diameter seal 148 (e.g., contact seal) against the exterior surface 128 of the second element core 113. In this way, fluid flowing through the filter element 101 is split and diverted into the first element core 111 and the second element core 113. The first outer diameter seal 138 (e.g., contact seal) against the exterior surface 118 of the first element core 111 and the second outer diameter seal 148 (e.g., contact seal) against the exterior surface 128 of the second element core 113 may be important seal locations for particularly an embodiment where the first element core 111 and second element core 113 are wound directly on the first endplate 102 and the second endplate 104. A first inner diameter seal 136 (e.g., contact seal) is created between the interior surface 116 of the first element core 111 and the first endplate 102 and a second inner diameter seal 136 (e.g., contact seal) is created between the interior surface 126 of the second element core 113 and the second endplate 104. In addition, a dynamic seal 156 is included between the second endplate 104 and a rotor outer diameter. In some embodiments, the dynamic seal 156 is not used. The various contact seals and dynamic seals described above are important in embodiments where the first element core 111 and the second element core 113 are embedded in the first endplate 102 and second endplate 104, respectively.

Fluid entering the rotating separator 100 flows into the filter housing 110 through an inlet 112 as shown by arrows 106. The fluid flows into the internal cavity 107 and then inside-out, radially outwardly from the internal cavity 107 through channels 160 surrounding the inner ring 117 of the spacer 120 and into the gap 121 between the first element core 111 and the second element core 113. The flow is split and flows axially into the first element core 111 at a first upstream side 182 and into the second element core 113 at a second upstream side 192. The fluid flows through the first element core 111 as shown by arrows 132 and through the second element core 113 as shown by arrows 134. The fluid exits the first element core 111 at a first downstream side 184 and exits the second element core 113 at a second downstream side 194. The cleaned fluid exiting the first element core 111 is directed through a first channel 162 formed in the first endplate 102 as shown by arrows 142. The cleaned fluid exiting the second element core 113 is directed through a second channel 164 formed in the second endplate 104 as shown by arrows 144. As shown in FIG. 1, the cleaned fluid moves substantially perpendicular to the longitudinal axis 150 of the filter element 101. The cleaned fluid then exits the filter housing 110 through an outlet 114 as shown by arrows 108.

Small aerosol droplets are coalesced into larger droplets within flow channels in each of the first element core 111 and the second element core 113 with the help of gravitational forces created by the rotation of the filter element 101. The aerosol droplets are shed at the first downstream side 184 and the second downstream side 194 of the respective element cores and are separated from the fluid flow stream. The shed aerosol droplets move downward along the interior surface 119 of the filter housing 110 substantially parallel to the longitudinal axis 150 as shown by arrows 152 and are directed back to the crankcase of the engine.

A barrier wall 171 extends into the outlet 114 such that the outlet 114 is not in a direct line-of-sight of potential liquid droplets that may be shed during the filtering process (e.g., droplets shed at the downstream sides of the filter element cores). Accordingly, the barrier wall 171 helps to prevent liquid droplets from creeping up the interior surface 119 of the filter housing and into the outlet 114. In addition, a sufficient gap between the filter element 101 and the interior surface 119 of the filter housing 101 is formed to prevent liquid droplets from being entrained in or affected by the spinning movement of the filter element 101 and creeping up the interior surface 119 of the filter housing 101 and into the outlet 114.

Figure 4:
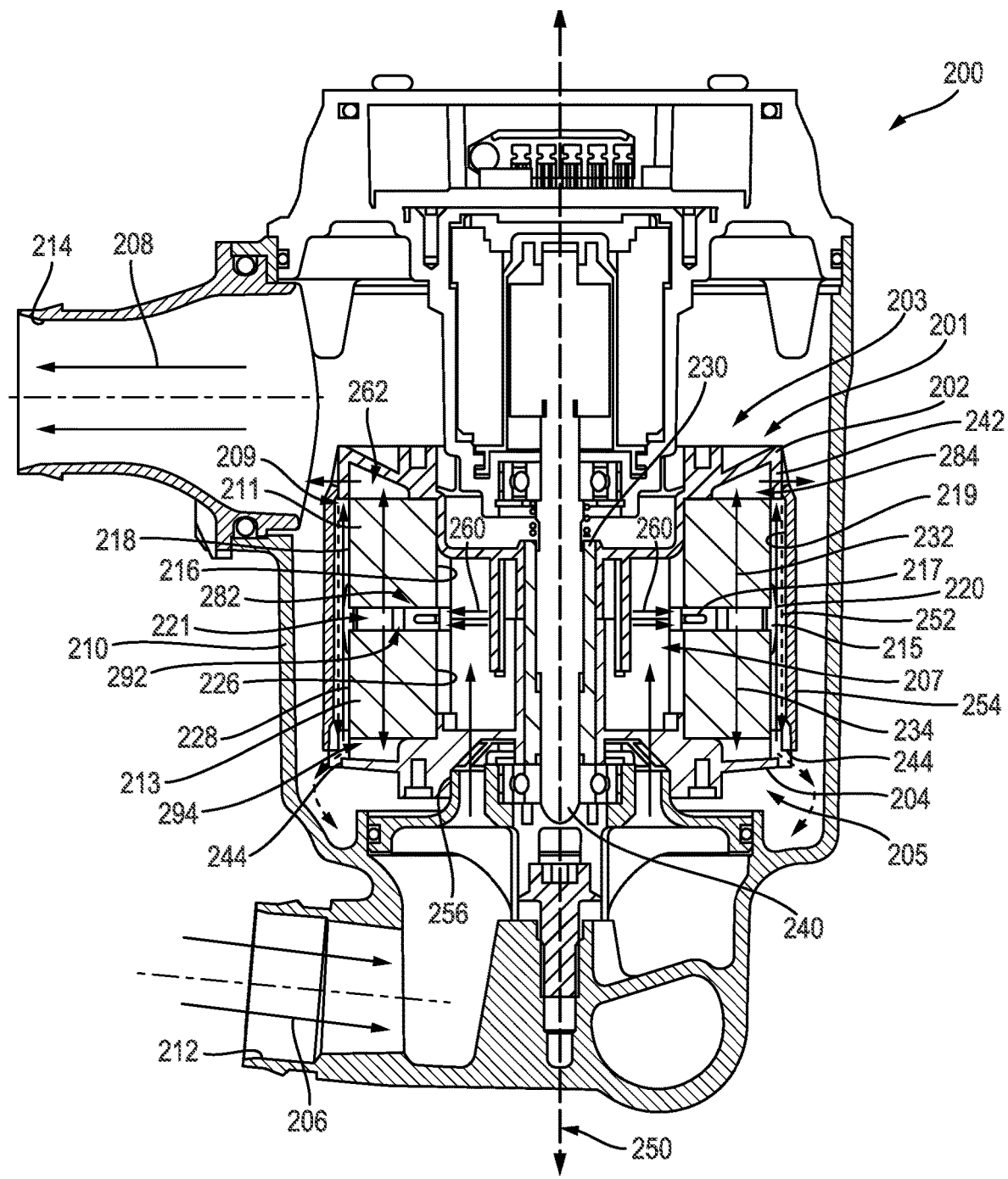
FIG. 4 shows a cross-sectional view of a rotating separator, according to another example embodiment.

Referring to FIG. 4, a rotating separator 200 is shown according to another example embodiment. The rotating separator 200 includes a filter element 201 having a longitudinal axis 250, with the filter element 201 positioned within a filter housing 210. The filter element 201 includes a first endplate 202 and a second endplate 204 operatively coupled together, with an internal cavity 207 defined between the first endplate 202 and the second endplate 204.

The rotating separator 200 includes a first element core 211 and a second element core 213 disposed between the first endplate 202 and the second endplate 204. The first element core 211 and second element core 213 are arranged along the longitudinal axis 250, with one of the first element core 211 and the second element core 213 positioned above the other along the longitudinal axis 250. The first element core 211 and the second element core 213 are fitted between the first endplate 202 and the second endplate 204, and, as such, extend between a first axial end 203 and a second axial end 205 of the filter element 201. The first element core 211 is wound directly on the first endplate 202, and the second element core 213 is wound directly on the second endplate 204. As noted above with regard to FIGS. 1-3, the element cores can be otherwise fitted between the first endplate 202 and the second endplate 204.

The filter element 201 includes a shroud 254 extending substantially between the first endplate 202 and the second endplate 204 radially outward from the exterior surface 218 of the first element core 211 and the exterior surface 228 of the second element core 213 relative to the longitudinal axis 250. An exterior channel 209 is formed between an interior surface 219 of the shroud 254 and the first element core 211 and the second element core 213. The first element core 211 is arranged in a cylindrical manner with an interior surface 216 defining a portion of the internal cavity 207 and an exterior surface 218 defining a portion of the exterior channel 209 (e.g., defined between the exterior surface 218 of the first element core 211 and an interior surface 219 of the shroud 254). The second element core 213 is arranged in a cylindrical manner with an interior surface 226 defining a portion of the internal cavity 207 and an exterior surface 228 defining a portion of the exterior channel 209 (e.g., defined between the exterior surface 228 of the second element core 213 and an interior surface 219 of the shroud 254). A channel or drain 244 is formed between the shroud 254 and the second endplate 204 proximate the second axial end 205 of the filter element 201. The shroud 254 contacts the first endplate 202 such that no fluid can move past the shroud 254 at an exterior surface 218 of the first element core 211.

A spacer 220 is positioned axially between the first element core 211 and the second element core 213, creating a gap 221 therebetween. The spacer 220 is similar to the spacer 120 shown in FIGS. 1-3. Accordingly, the spacer 220 interacts with the filter element 201 in a similar manner.

Fluid entering the rotating separator 200 flows into the filter housing 210 through an inlet 212 as shown by arrows 206. The fluid flows into the internal cavity 207 and then inside-out, radially outwardly from the internal cavity 207 through channels 260 surrounding the inner ring 217 of the spacer 220 and into the gap 221 between the first element core 211 and the second element core 213. The flow is split and flows axially into the first element core 211 at a first upstream side 282 and into the second element core 213 at a second upstream side 292. The fluid flows through the first element core 211 as shown by arrows 232 and through the second element core 213 as shown by arrows 234. The fluid exits the first element core 211 at a first downstream side 284 and exits the second element core 213 at a second downstream side 294. The cleaned fluid exiting the first element core 211 is directed through a first channel 262 formed in the first endplate 202 as shown by arrows 242. The cleaned fluid exiting the second element core 213 is directed back upward through the exterior channel 209 (e.g., along interior surface 219 of the shroud 254) from the second axial end 205 toward the first axial end 203. As shown in FIG. 4, the cleaned fluid exiting from the first element core 211 moves substantially perpendicular to the longitudinal axis 250 of the filter element 201 and the cleaned fluid exiting from the second element core 213 moves first substantially perpendicular to the longitudinal axis 250, turns upward, and then moves substantially parallel to the longitudinal axis 250 and out of the filter element 201 through channel 262 formed in the first endplate 202. The cleaned fluid then exits the filter housing 210 through an outlet 214 as shown by arrows 208.

Liquid droplets separated from the filtered fluid moves downward along the interior surface 219 of the shroud 254 prior to exiting the filter element 201 through the drain 244 formed between the shroud 254 and the second endplate 204 proximate the second axial end 205. In this way, the gap between the filter element 201 and the filter housing 210 does not need to be large because the outlet 214 is not in a direct line-of-sight of a liquid droplet trajectory. The separated liquid then can be directed back to the crankcase of the engine.

Figure 5:
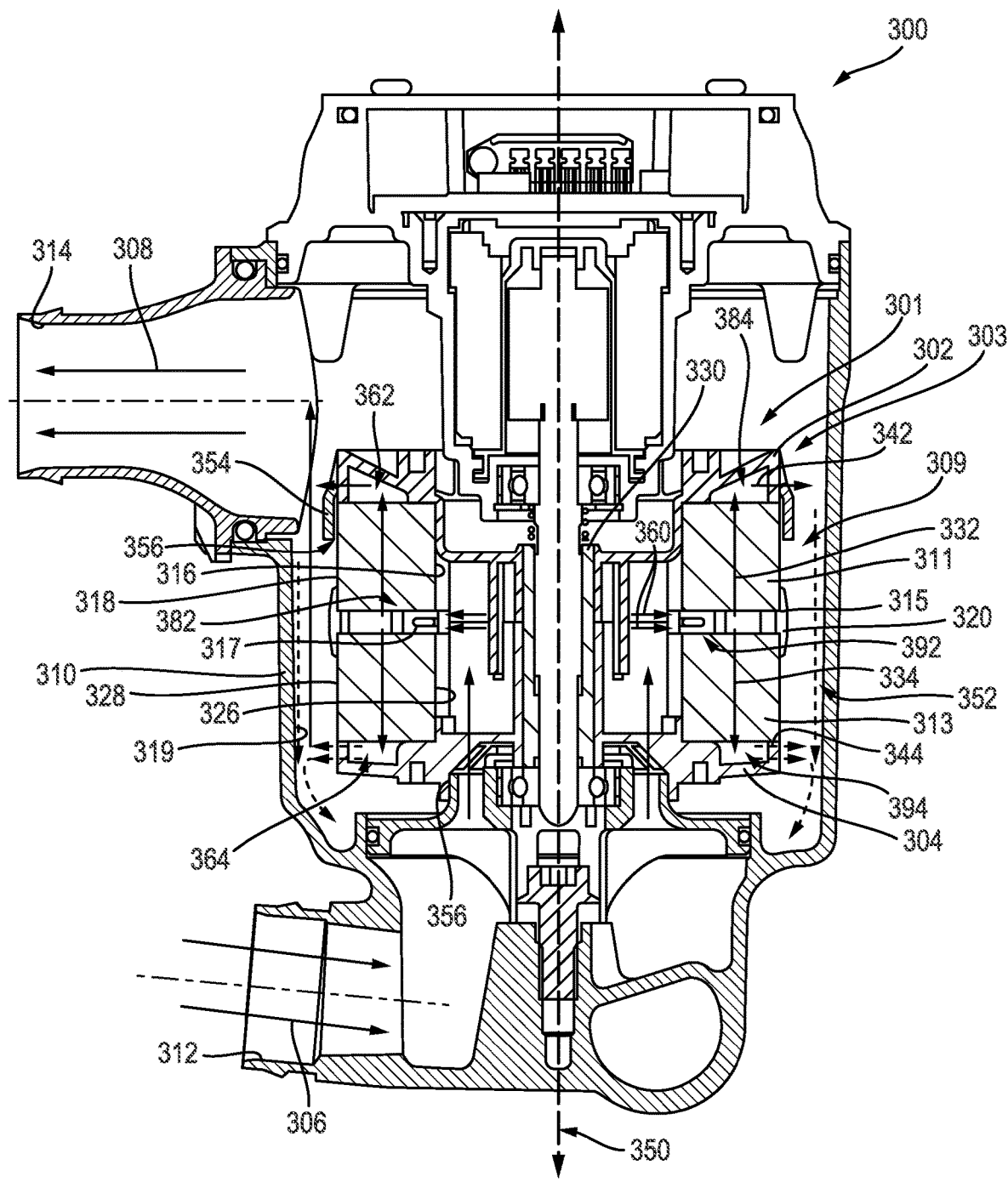
FIG. 5 shows a cross-sectional view of a rotating separator, according to another example embodiment.

Referring to FIG. 5, a rotating separator 300 is shown according to another example embodiment. The rotating separator 300 includes a filter element 301 having a longitudinal axis 350, where the filter element 301 is positioned within a filter housing 310. The filter element 301 includes a first endplate 302 and a second endplate 304 operatively coupled together, with an internal cavity 307 defined between the first endplate 302 and the second endplate 304.

The rotating separator 300 includes a first element core 311 and a second element core 313 disposed between the first endplate 302 and the second endplate 304. The first element core 311 and second element core 313 are arranged along the longitudinal axis 350, with one of the first element core 311 and second element core 313 positioned above the other along the longitudinal axis 350. The first element core 311 and the second element core 313 are fitted between the first endplate 302 and the second endplate 304, and as such, extend between a first axial end 303 and a second axial end 305 of the filter element 301. The first element core 311 is wound directly on the first endplate 302 and the second element core 313 is wound directly on the second endplate 304. As noted above with regard to FIGS. 1-3, the element cores can be otherwise fitted between the first endplate 302 and the second endplate 304.

The first element core 311 is arranged in a cylindrical manner with an interior surface 316 defining a portion of the internal cavity 307 and an exterior surface 318 defining a portion of an exterior channel 309 (e.g., defined between the exterior surface 318 of the first element core 311 and an interior surface 319 of the filter housing 310). The second element core 313 is arranged in a cylindrical manner with an interior surface 326 defining a portion of the internal cavity 307 and an exterior surface 328 defining a portion of an exterior channel 309 (e.g., defined between the exterior surface 328 of the second element core 313 and an interior surface 319 of the filter housing 310).

A spacer 320 is positioned axially between the first element core 311 and the second element core 313, creating a gap 321 therebetween. The spacer 320 is similar to the spacer 120 shown in FIGS. 1-3. Accordingly, the spacer 320 interacts with the filter element 301 in a similar manner.

The filter element 301 includes a partial shroud 354 extending substantially partially between the first endplate 302 and the outer ring 315 of the spacer 320 and radially outward from the exterior surface 318 of the first element core 311 relative to the longitudinal axis 350. The shroud 354 contacts the first endplate 302 such that no fluid can move past the shroud 354 at an exterior surface 318 of the first element core 311.

Fluid entering the rotating separator 300 flows into the filter housing 310 through an inlet 312 as shown by arrows 306. The fluid flows into the internal cavity 307 and then inside-out, radially outwardly from the internal cavity 307 through channels 360 surrounding the inner ring 317 of the spacer 320 and into the gap 321 between the first element core 311 and the second element core 313. The flow is split and flows axially into the first element core 311 at a first upstream side 382 and into the second element core 313 at a second upstream side 392. The fluid flows through the first element core 311 as shown by arrows 332 and through the second element core 313 as shown by arrows 334. The fluid exits the first element core 311 at a first downstream side 384 and exits the second element core 313 at a second downstream side 394. The cleaned fluid exiting the first element core 311 is directed through a first channel 362 formed in the first endplate 302 as shown by arrows 342. The cleaned fluid exiting the second element core 313 is directed through a second channel 364 formed in the second endplate 304 as shown by arrows 344. As shown in FIG. 1, the cleaned fluid moves substantially perpendicular to the longitudinal axis 350 of the filter element 301. The cleaned fluid then exits the filter housing 310 through an outlet 314 as shown by arrows 308.

Liquid droplets separated from the filtered fluid at the first element core 311 move downward along the interior surface of the partial shroud 354 prior to dropping off and moving along the interior surface 319 of the filter housing 310. The shed droplets move downward along the interior surface 319 of the filter housing 310 substantially parallel to the longitudinal axis 350 as shown by arrows 352 and are directed back to the crankcase of the engine. The partial shroud 354 thus removes the direct line-of-sight between the liquid droplet trajectory and the outlet 314 thereby preventing liquid droplets from entering the outlet 314.

Figure 7:
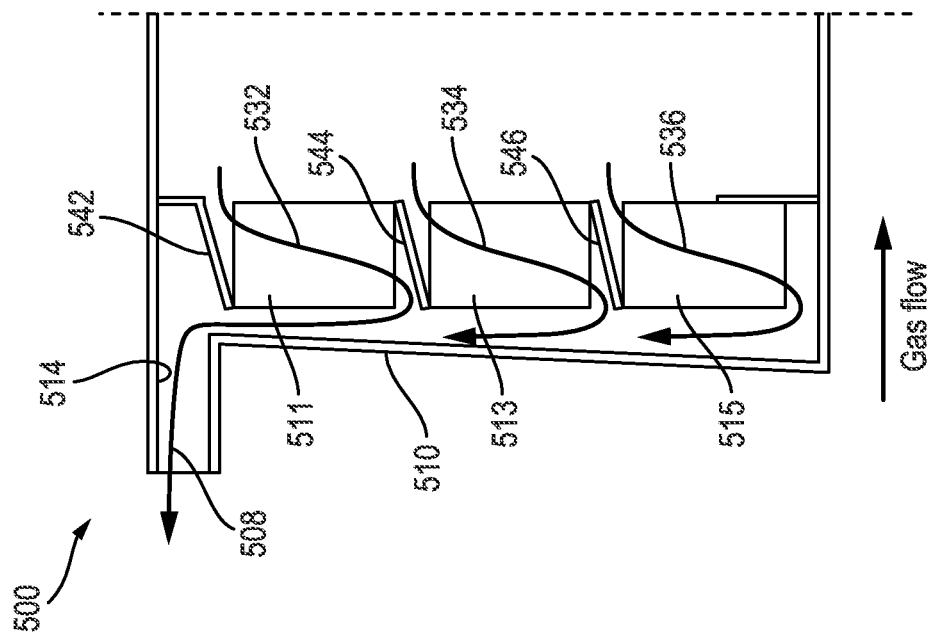
FIG. 7 shows a cross-sectional view of an element core of a rotating separator, according to an example embodiment.
Figure 6:
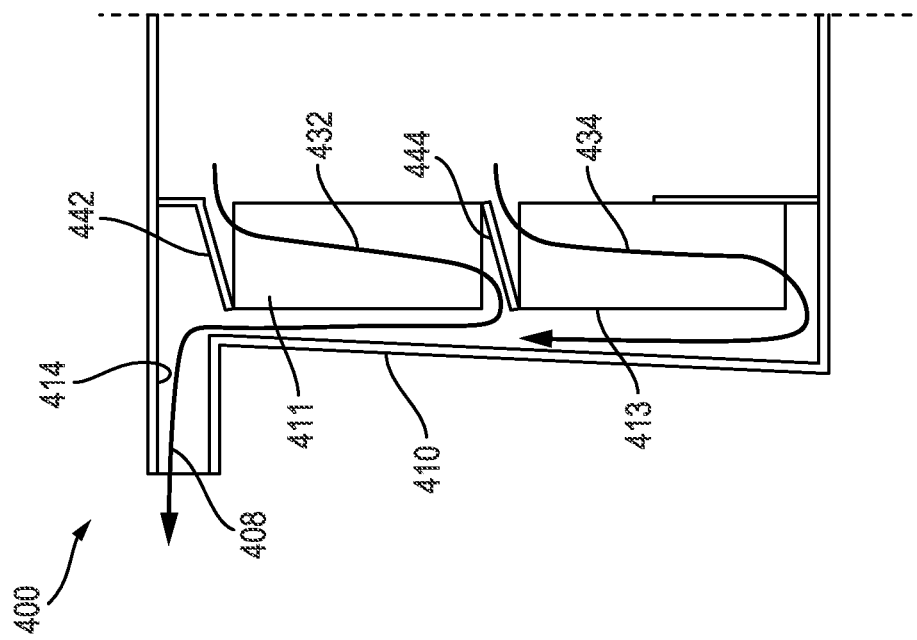
FIG. 6 shows a cross-sectional view of an element core of a rotating separator, according to an example embodiment.

Referring to FIGS. 6-7, separators 400 and 500 are shown, according to yet other example embodiments. The separator 400 includes a first element core 411 and a second element core 413. The separator 500 includes a first element core 511, a second element core 513, and a third element core 515. As shown, the fluid flowing therethrough is filtered in parallel by each of the element cores. Pressure drop across the separators decreases with an increase in the number of element cores. Accordingly, the pressure drop across the separator 500 is lower than the pressure drop across the separator 400.

Figure 8:
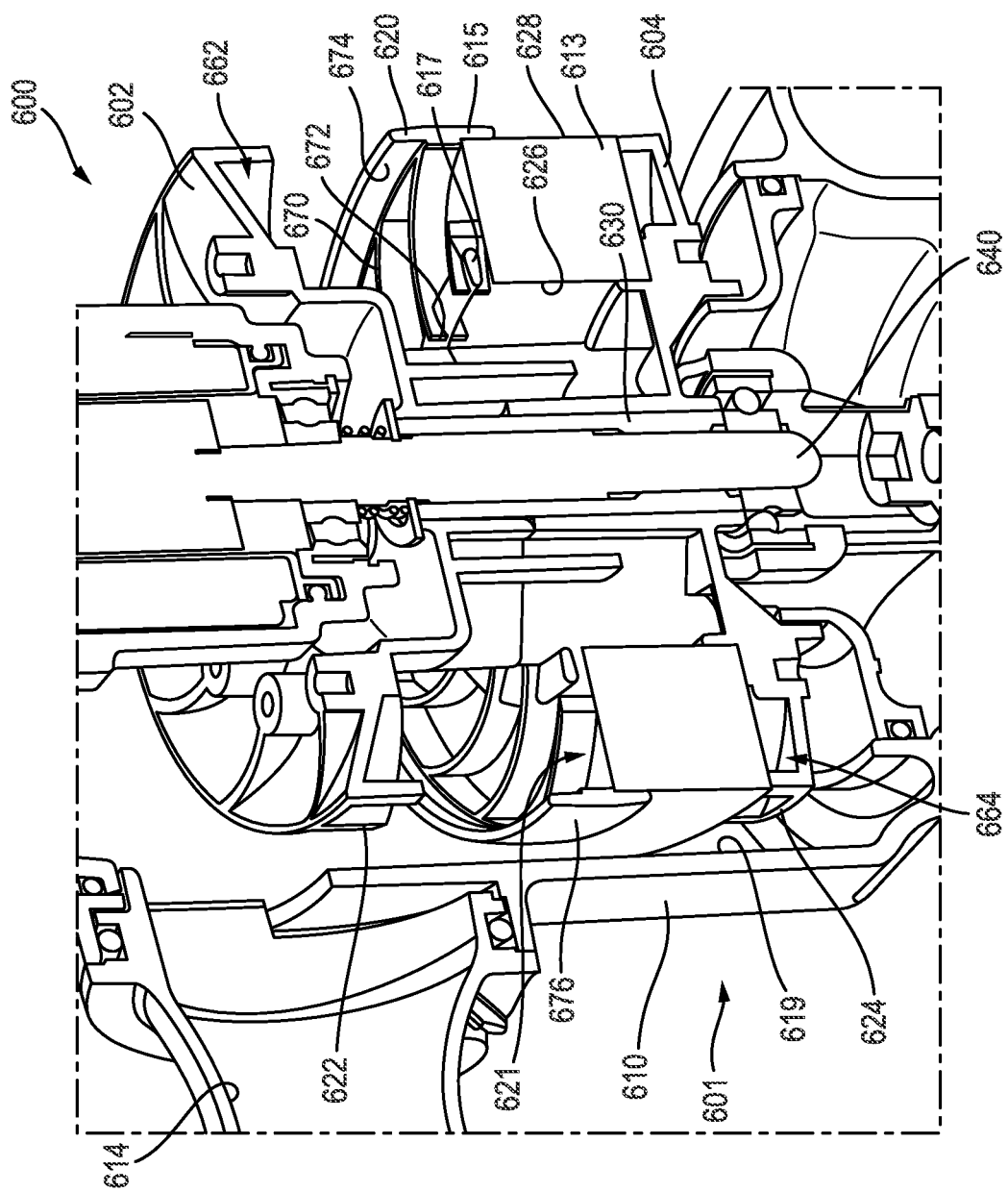
FIG. 8 shows a perspective cross-sectional view of a portion of a rotating separator, according to an example embodiment.

Referring to FIG. 8, the spacer 620 is shown in use on a rotating separator 600.

Figure 9:
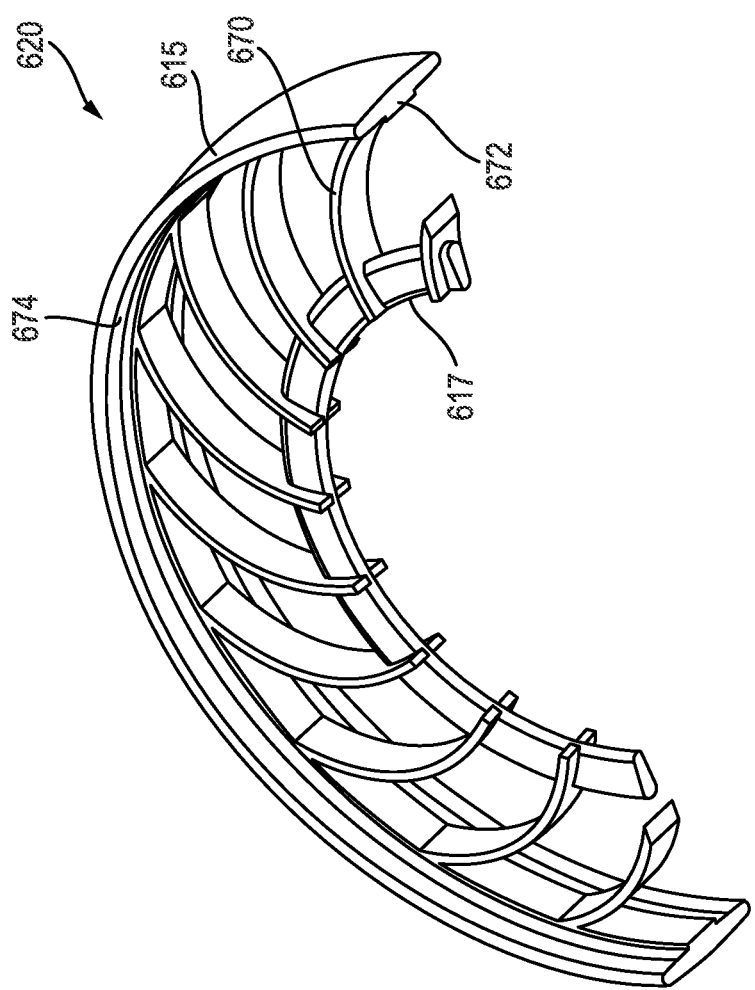
FIG. 9 shows a perspective cross-sectional view of a spacer of the rotating separator of FIG. 8.

Referring to FIG. 9, the spacer 620 is shown. As described above, the spacer 620 is used to split the fluid flow within the filter element 601. The spacer 620 includes an outer ring 615 and an inner ring 617. The spacer 620 forms a gap 621 between the first element core (not shown) and the second element core 613. Vanes 670 extend between the interior surfaces of the first element core and the second element core 613 and the inner diameter 672 of the spacer 620. The vanes 670 are configured to enable reduction in flow circulation in the gap 621 between the first element core and the second element core 613. The reduction in flow circulation enables lower overall pressure drop across the filter element 601.

Figure 12:
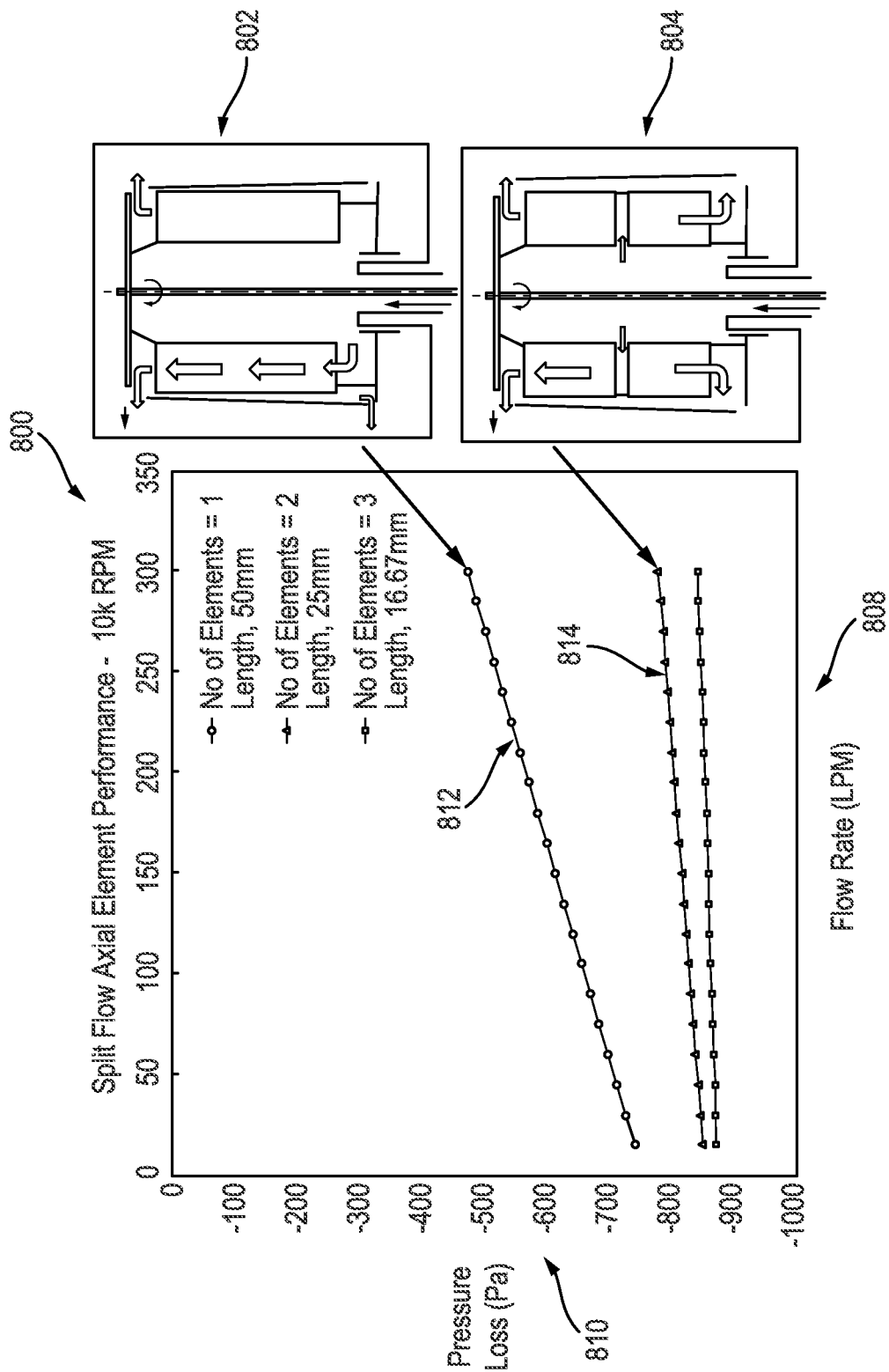
FIG. 12 shows the relative performance of a split flow element compared to a single core element.

Referring to FIG. 12, the relative performance 800 of the split flow element 804 described herein compared to a single core element 802 is shown. The single core element 802 includes a single filter core element disposed within a filter housing. Fluid flowing through the single core element 802 flows into the housing and through the single filter core element, where clean fluid is directed out of the housing through an outlet and liquid/aerosol droplets are drained back to the crankcase of an engine. The split flow element 804 is similar to the filter elements described herein such that at least two core elements are used to filter the fluid flow in an axial and parallel manner. The pressure loss 810 for each type of filter element is graphed against various flow rates 808, shown as 812 for the single core element 802 and as 814 for the split flow element 804. As shown, the graphed line 812 of the pressure loss for the single core element 802 is higher than graphed line 814 of the pressure loss for the split flow element 804 across all flow rates. In addition, the graphed line 812 of the pressure loss for the single core element 802 increases at a steeper rate at higher flow rates than the graphed line 814 of the pressure loss for the split flow element 804.

Figure 13:
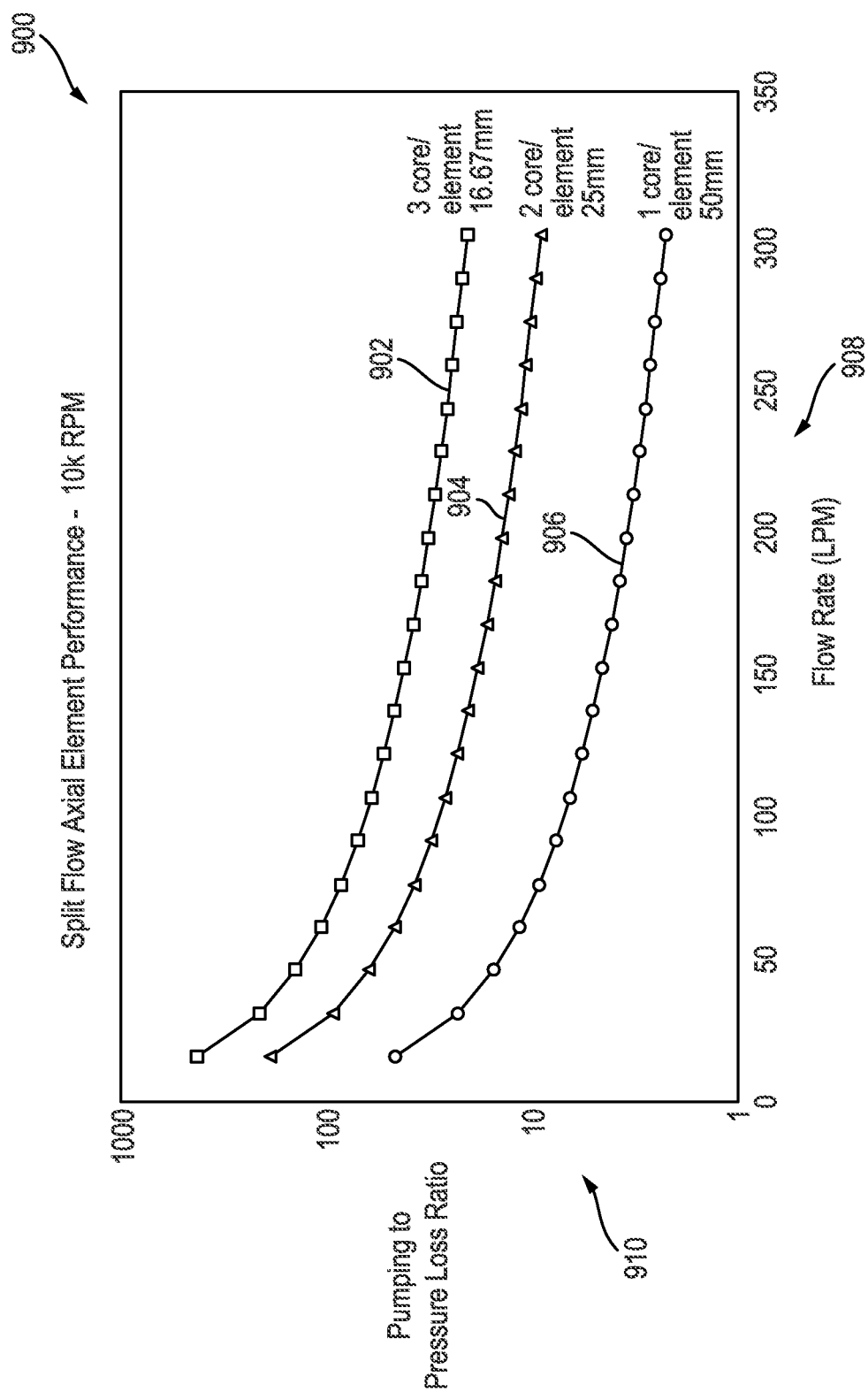
FIG. 13 shows the pumping performance of different types of filter elements, according to another example embodiment.

Referring to FIG. 13, the relative performance 900 of various types of filter elements is shown. The pumping to pressure loss ratio 910 is graphed over a series of different flow rates 908, shown as 902 for a three core element, 904 for a two core element, and 906 for a single core element. As shown, the pumping to pressure loss ratios increase as the number of cores increase. This indicates that the pumping rate as compared to the pressure loss is relatively much higher with increasing number of cores.

Figure 14:
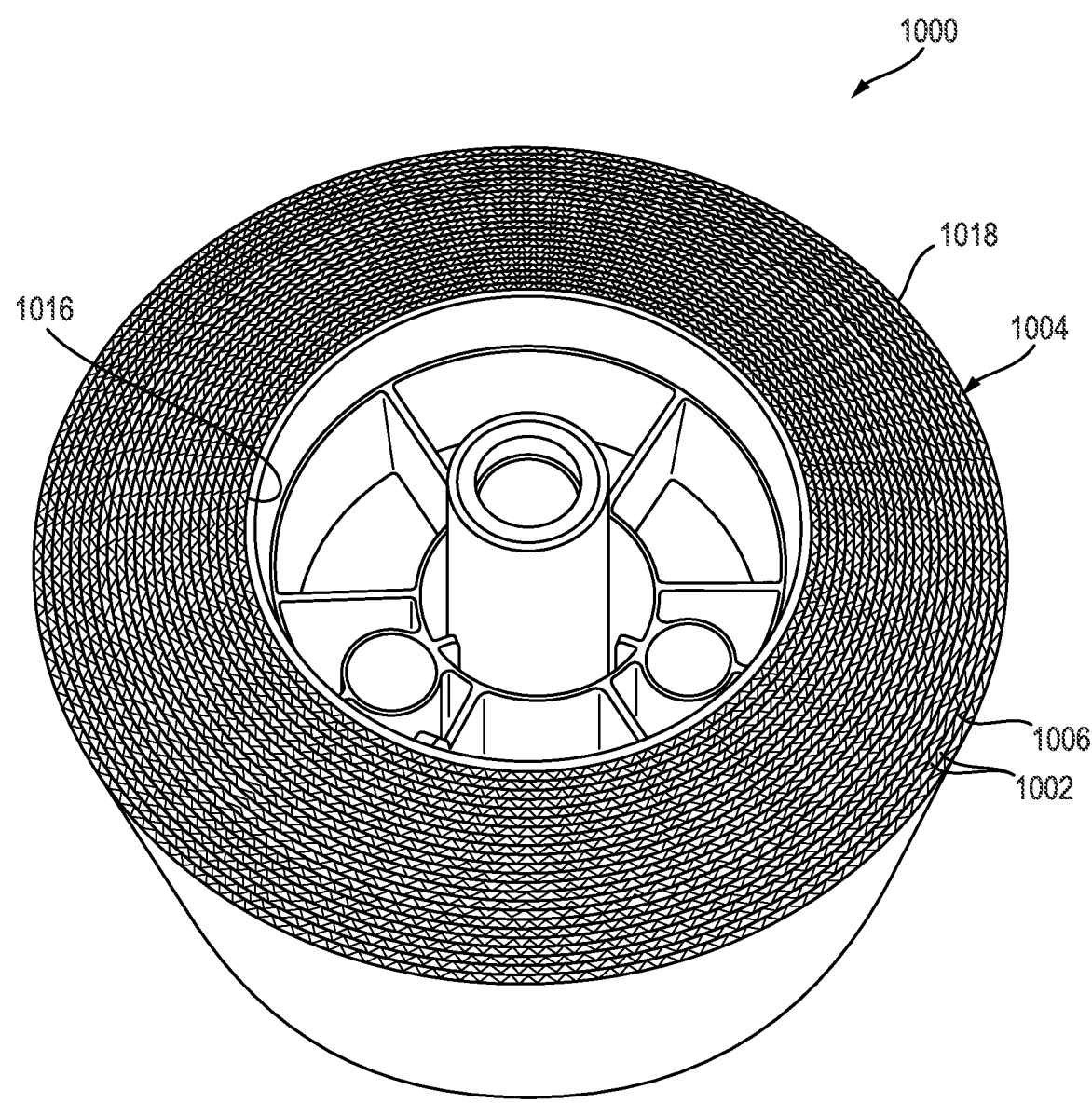
FIG. 14 shows an element core of a rotating separator, according to an example embodiment.

Referring to FIG. 14, an element core 1000 is shown, according to an example embodiment. The element core 1000 is wound directly onto an endplate as described herein. As shown, the element core 1000 is made of a rolled-up corrugated foil structure having axial flow channels 1004. The axial flow channels 1004 are defined by corrugated structures 1006 formed in (e.g., wound into) multiple layers 1002. The gaps between the corrugated structures 1006 and the boundary of each layer 1002 define the axial flow channels 1004. In some embodiments, the corrugated structures 1006 are made of a metallic foil structure.

The element core 1000 is arranged in a cylindrical manner, with an interior surface 1016 defining a portion of an internal cavity and an exterior surface 1018 defining a portion of an exterior channel defined between the exterior surface 1018 of the element core 1000 and an interior surface of a filter housing. Fluid flowing through a separator enters the element core 1000 at an upstream side and flows axially through the axially flow channels 1004 and exits at a downstream side. Small aerosol droplets are coalesced into larger droplets within the axial flow channels 1004 and are shed and separated from the fluid flow stream at the downstream side of the element core 1000.

Figure 15:
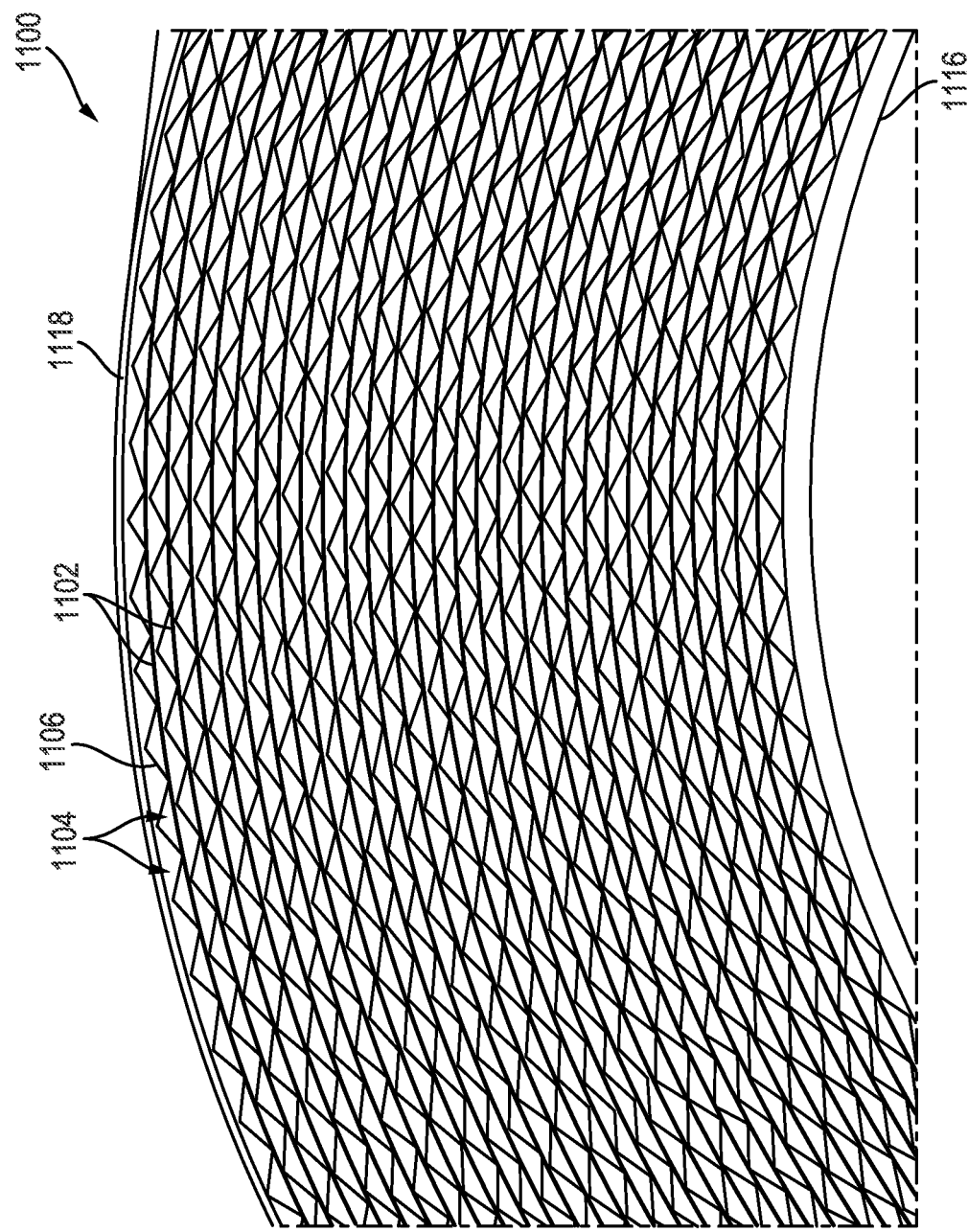
FIG. 15 shows a cross-sectional view of an element core, according to an example embodiment.
Figure 16:
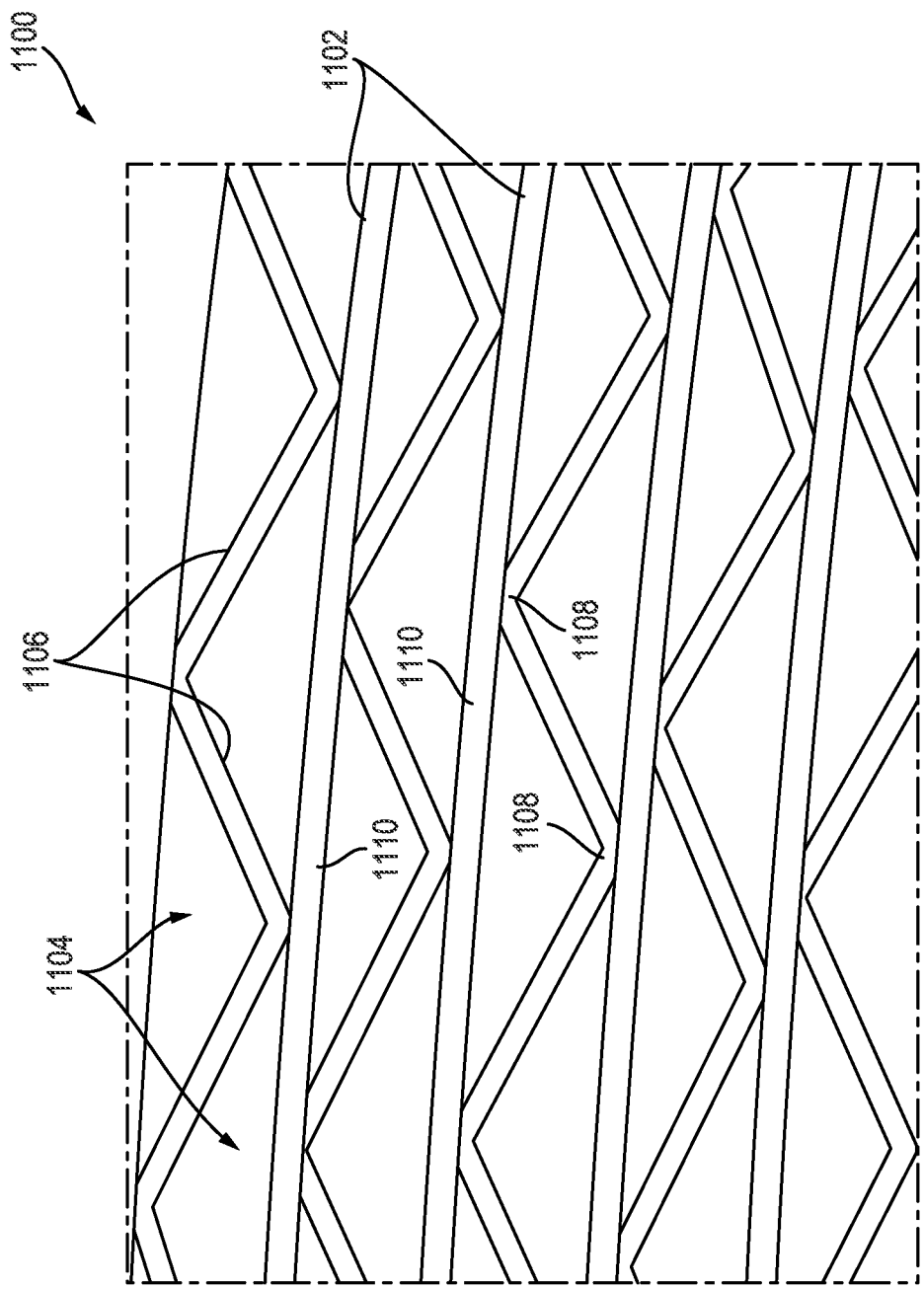
FIG. 16 shows a cross-sectional view of a portion of the element core of FIG. 15.

Referring to FIGS. 15-19, cross-sectional views of various example embodiments of rolled-up corrugated structures used in various element cores are shown. Referring to FIGS. 15-16, the element core 1100 includes multiple layers 1102 of corrugated structures 1106 are formed such that peaks 1108 of the corrugated structures 1106 in each layer 1102 contact the inner surface of each layer boundary 1110. Axial flow channels 1104 are formed between each layer boundary 1110 and the corrugated structures 1106 (e.g., between each layer boundary 1110 and each peak 1108). As shown in FIGS. 15-16, the axial flow channels 1104 are formed in a triangular shape along a cross-section of the element core 1100.

Figure 17:
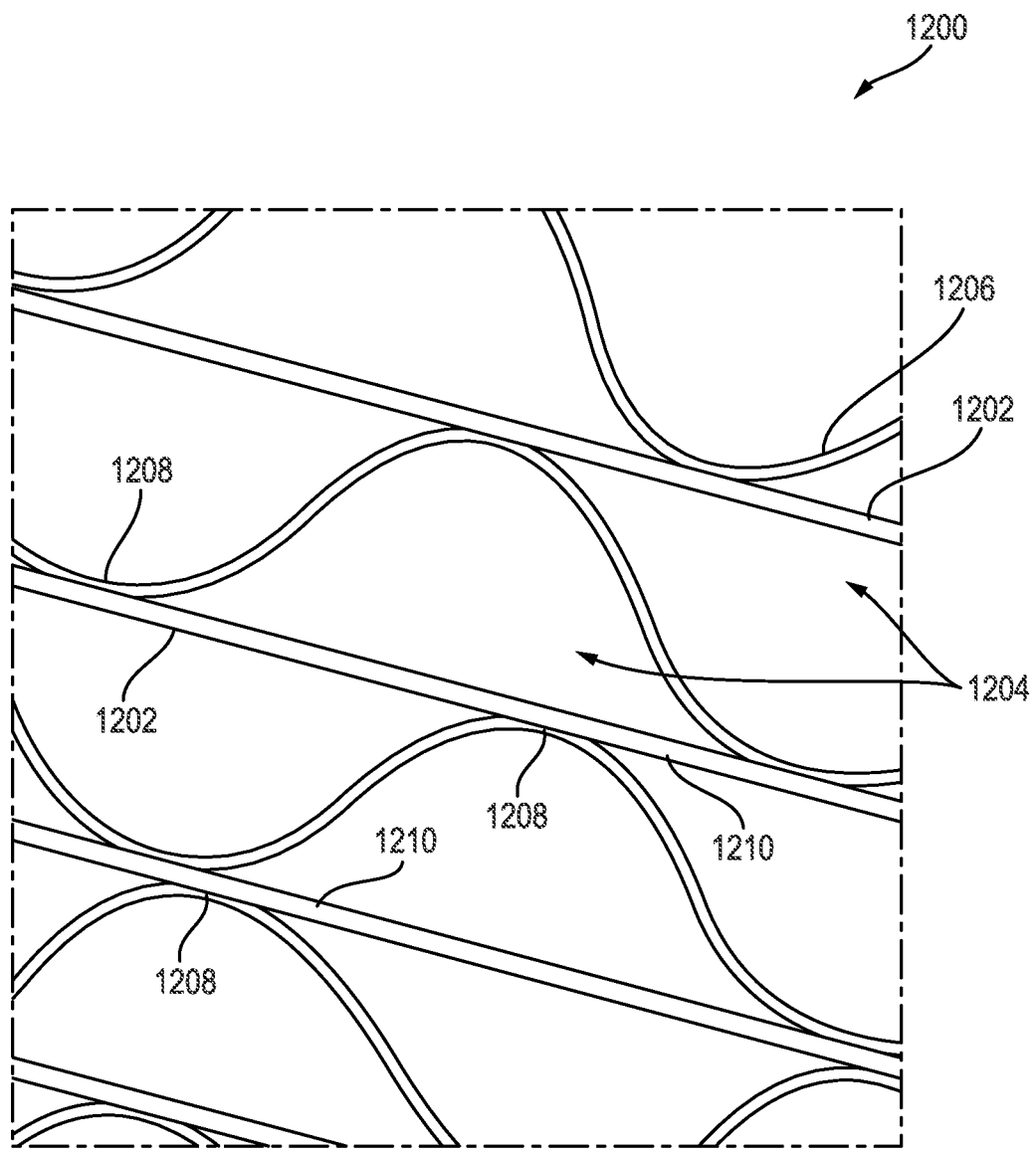
FIG. 17 shows a cross-sectional view of an element core, according to another example embodiment.

Referring to FIG. 17, the element core 1200 includes multiple layers 1202 of corrugated structures 1206. The corrugated structures 1206 are sinusoidal or wavy in shape and are formed such that apexes 1208 of the corrugated structures 1206 in each layer 1202 contact the inner surface of each layer boundary 1210. Axial flow channels 1204 are formed between each layer boundary 1210 and the corrugated structures 1206 (e.g., between each layer boundary 1210 and each apex 1208).

Figure 18:
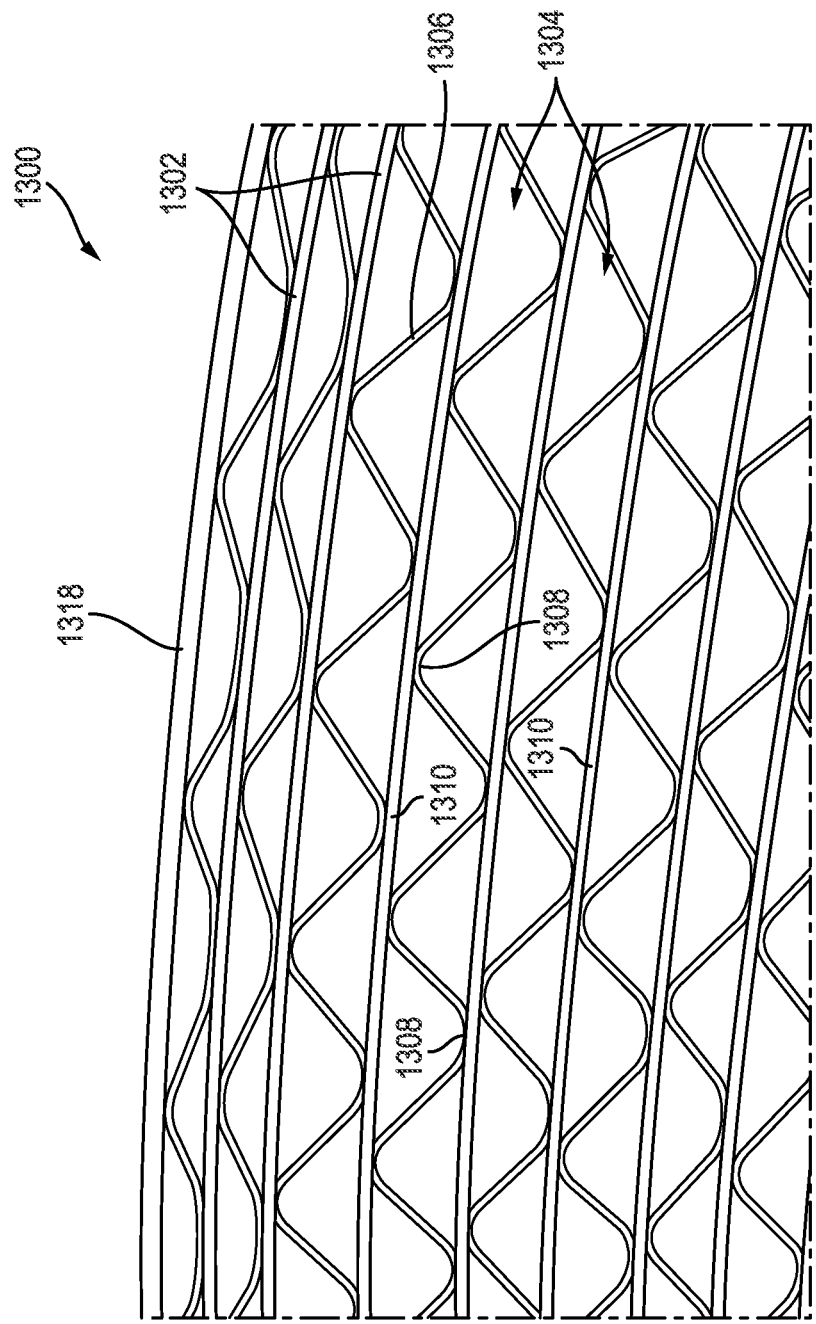
FIG. 18 shows a cross-sectional view of an element core, according to still another example embodiment.

Referring to FIG. 18, the element core 1300 includes multiple layers 1302 of corrugated structures 1306. The corrugated structures 1306 are partially straight and partially sinusoidal or wavy in shape and are formed such that apexes 1308 of the corrugated structures 1306 in each layer 1302 contact the inner surface of each layer boundary 1310. Axial flow channels 1304 are formed between each layer boundary 1310 and the corrugated structures 1306 (e.g., between each layer boundary 1310 and each apex 1308).

Figure 19:
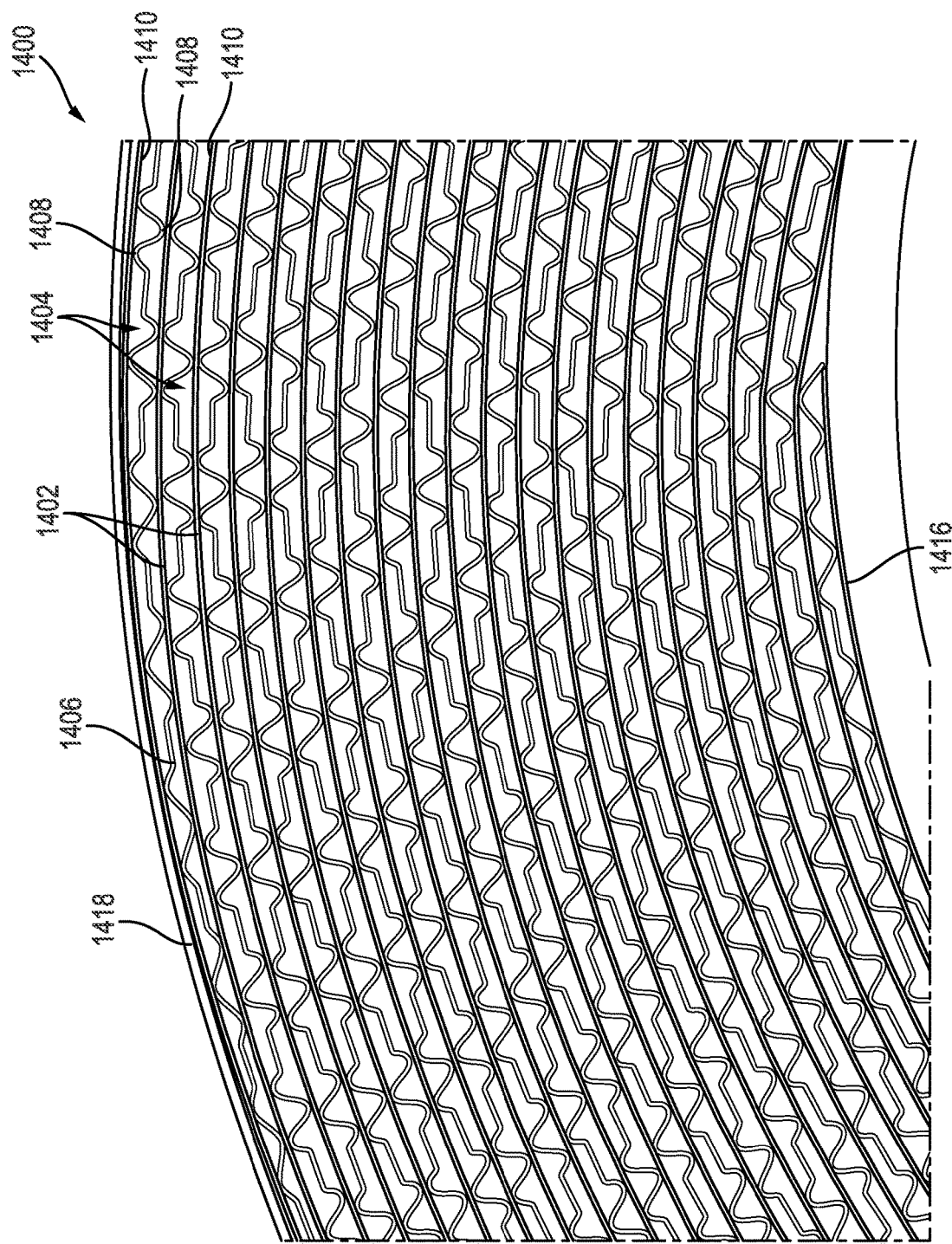
FIG. 19 shows a cross-sectional view of an element core, according to yet another example embodiment.

Referring to FIG. 19, the element core 1400 includes multiple layers 1402 of corrugated structures 1406. The corrugated structures 1406 are irregular in shape and are formed such that at various points along the corrugated structures 1406 contact the inner surface of each layer boundary 1410. Axial flow channels 1404 are formed between each layer boundary 1410 and the corrugated structures 1406 (e.g., between each layer boundary 1410 and each point 1408 at which the corrugated structures 1406 contact the inner surface of each layer boundary 1410). The example embodiments of the elements cores 1000-1400 are not meant to be limiting. Various other shapes and types of corrugated structures can be used in the element cores described herein.

References herein to the positions of elements (e.g., "top," "bottom," "above," "below," etc.) are merely used to describe the orientation of various elements in the Figures. It should be noted that the orientation of various elements may differ according to other example embodiments, and that such variations are intended to be encompassed by the present disclosure. Further, the formation of a passage by one or more surfaces can comprise a wide variety of passage cross-sectional shapes, for example, passages having circular, rectangular, oval, etc. cross-sectional shapes.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications to the flow structures are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter element comprising:
   a first endplate and a second endplate operatively coupled to the first endplate;
   a first element core and a second element core each positioned between the first endplate and the second endplate and configured to filter a contaminate from a fluid, the first element core and the second element core are made of axial flow channels formed by one or more corrugated structures wound into one or more layers, the first element core wound directly on the first endplate; and
   an interior cavity defined between the first endplate, the second endplate, the first element core, and the second element core,
   wherein fluid flowing through the filter element enters the interior cavity and is split between and flows in parallel through the first element core and the second element core.

2. The filter element of claim 1, further comprising a spacer positioned between and creating a gap between the first element core and the second element core, the spacer comprising vanes configured to reduce circulation of fluid flow within the gap.

3. The filter element of claim 2, wherein the spacer comprises a first sealing surface and a second sealing surface, the first sealing surface creating a first seal between the spacer and a first element core exterior surface of the first element core, the second sealing surface creating a second seal between the spacer and a second element core exterior surface of the second element core.

4. The filter element of claim 1, further comprising a shroud extending from the first endplate to proximate the second endplate and externally to the first element core and the second element core, the shroud comprising an internal surface where liquid droplets separated from the fluid flowing through the filter element flow downward toward a drain formed between the shroud and the second endplate.

5. The filter element of claim 1, further comprising a partial shroud positioned in contact with the first endplate and extending partially along an exterior surface of the first element core, the partial shroud redirecting liquid droplets separated from the fluid flowing through the first element core.

6. The filter element of claim 1, wherein the second element core is wound directly on the second endplate.

7. The filter element of claim 1, further comprising a third element core positioned between the first endplate and the second endplate and configured to filter the contaminate from a fluid, wherein the fluid is split between and flows in parallel through the first element core, the second element core, and the third element core.

8. A rotating separator comprising:
   a filter housing extending axially along a longitudinal axis; and
   a filter element positioned within the filter housing, the filter element comprising:
   a first endplate and a second endplate operatively coupled to the first endplate;
   a first element core and a second element core each positioned between the first endplate and the second endplate and configured to filter a contaminate from a fluid; and
   an interior cavity defined between the first endplate, the second endplate, the first element core, and the second element core, and
   a spacer positioned between and creating a gap between the first element core and the second element core, the spacer comprising vanes configured to reduce circulation of fluid flow within the gap;
   wherein fluid flowing through the filter element enters the interior cavity and is split between and flows in parallel through the first element core and the second element core.

9. The rotating separator of claim 8, further comprising a shroud extending from the first endplate to proximate the second endplate and externally to the first element core and the second element core, the shroud comprising an internal surface where liquid droplets separated from the fluid flowing through the filter element flow downward toward a drain formed between the shroud and the second endplate.

10. The rotating separator of claim 8, further comprising a partial shroud positioned in contact with the first endplate and extending partially along an exterior surface of the first element core, the partial shroud redirecting liquid droplets separated from the fluid flowing through the first element core.

11. The rotating separator of claim 8, wherein the first element core and the second element core are made of axial flow channels formed by one or more corrugated structures wound into one or more layers.

12. The rotating separator of claim 8, wherein the first element core is wound directly on the first endplate, and the second element core is wound directly on the second endplate.

13. The rotating separator of claim 8, further comprising a third element core positioned between the first endplate and the second endplate and configured to filter the contaminate from a fluid, wherein the fluid is split between and flows in parallel through the first element core, the second element core, and the third element core.

14. The rotating separator of claim 8, further comprising an inlet formed in the filter housing receiving fluid to be filtered and an outlet formed in the filter housing directed cleaned fluid out of the filter housing, the outlet comprising a wall extending at least partially into a flow channel of outlet.

15. A filter element comprising:
a first endplate and a second endplate operatively coupled to the first endplate;
a first element core and a second element core each positioned between the first endplate and the second endplate and configured to filter a contaminate from a fluid, the first element core comprises axial flow channels formed by one or more corrugated structures wound into one or more layers;
an interior cavity defined between the first endplate, the second endplate, the first element core, and the second element core; and
a shroud extending proximate at least one of the first element core and the second element core and comprising an internal surface where liquid droplets separated from the fluid flowing through the filter element flow downward toward a drain formed between the shroud and the second endplate.

16. The filter element of claim 15, wherein the first element core and the second element core comprises axial flow channels formed by one or more corrugated structures wound into one or more layers.

17. The filter element of claim 15, further comprising a spacer positioned between and creating a gap between the first element core and the second element core, the spacer comprising vanes configured to reduce circulation of fluid flow within the gap.

18. The filter element of claim 15, wherein the first element core is wound directly on the first endplate, and the second element core is wound directly on the second endplate.

19. A filter element comprising:
a first endplate and a second endplate operatively coupled to the first endplate;
a first element core and a second element core each positioned between the first endplate and the second endplate and configured to filter a contaminate from a fluid; and
an interior cavity defined between the first endplate, the second endplate, the first element core, and the second element core,
wherein fluid flowing through the filter element enters the interior cavity and is split between and flows in parallel through the first element core and the second element core, and further comprising a partial shroud positioned in contact with the first endplate and extending partially along an exterior surface of the first element core, the partial shroud redirecting liquid droplets separated from the fluid flowing through the first element core.

20. A rotating separator comprising:
a filter housing extending axially along a longitudinal axis;
a filter element positioned within the filter housing, the filter element comprising:
  a first endplate and a second endplate operatively coupled to the first endplate;
  a first element core and a second element core each positioned between the first endplate and the second endplate and configured to filter a contaminate from a fluid; and
  an interior cavity defined between the first endplate, the second endplate, the first element core, and the second element core,
wherein fluid flowing through the filter element enters the interior cavity and is split between and flows in parallel through the first element core and the second element core, and further comprising a partial shroud positioned in contact with the first endplate and extending partially along an exterior surface of the first element core, the partial shroud redirecting liquid droplets separated from the fluid flowing through the first element core.

21. A filter element comprising:
a first endplate and a second endplate operatively coupled to the first endplate;
a first element core and a second element core each positioned between the first endplate and the second endplate and configured to filter a contaminate from a fluid, the first element core wound directly on the first endplate;
an interior cavity defined between the first endplate, the second endplate, the first element core, and the second element core; and
a spacer positioned between and creating a gap between the first element core and the second element core, the spacer comprising vanes configured to reduce circulation of fluid flow within the gap,
wherein fluid flowing through the filter element enters the interior cavity and is split between and flows in parallel through the first element core and the second element core.

22. The filter element of claim 21, wherein the spacer comprises a first sealing surface and a second sealing surface, the first sealing surface creating a first seal between the spacer and a first element core exterior surface of the first element core, the second sealing surface creating a second seal between the spacer and a second element core exterior surface of the second element core.

23. A filter element comprising:
a first endplate and a second endplate operatively coupled to the first endplate;
a first element core and a second element core each positioned between the first endplate and the second endplate and configured to filter a contaminate from a fluid, the first element core wound directly on the first endplate;
an interior cavity defined between the first endplate, the second endplate, the first element core, and the second element core; and
a shroud extending from the first endplate to proximate the second endplate and externally to the first element core and the second element core,
wherein fluid flowing through the filter element enters the interior cavity and is split between and flows in parallel through the first element core and the second element core, and wherein the shroud comprises an internal surface where liquid droplets separated from the fluid flowing through the filter element flow downward toward a drain formed between the shroud and the second endplate.

24. A filter element comprising:
a first endplate and a second endplate operatively coupled to the first endplate;
a first element core and a second element core each positioned between the first endplate and the second endplate and configured to filter a contaminate from a fluid, the first element core wound directly on the first endplate;
an interior cavity defined between the first endplate, the second endplate, the first element core, and the second element core; and
a partial shroud positioned in contact with the first endplate and extending partially along an exterior surface of the first element core, wherein fluid flowing through the filter element enters the interior cavity and is split between and flows in parallel through the first element core and the second element core, and wherein the partial shroud redirects liquid droplets separated from the fluid flowing through the first element core.

* * * * *